(12) United States Patent
De Hoog et al.

(10) Patent No.: US 7,386,866 B2
(45) Date of Patent: Jun. 10, 2008

(54) DISK DRIVE WITH IMPROVED TRAY CONTROL

(75) Inventors: Thomas Jan De Hoog, Eindhoven (NL); Rob Jacobus Matheus Coolen, Eindhoven (NL); George Alois Leonie Leenknegt, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 219 days.

(21) Appl. No.: 10/562,882

(22) PCT Filed: Jun. 25, 2004

(86) PCT No.: PCT/IB2004/051009

§ 371 (c)(1),
(2), (4) Date: Dec. 29, 2005

(87) PCT Pub. No.: WO2005/001827

PCT Pub. Date: Jan. 6, 2005

(65) Prior Publication Data

US 2006/0161929 A1    Jul. 20, 2006

(30) Foreign Application Priority Data

Jun. 30, 2003   (EP) ................................ 03077006

(51) Int. Cl.
*G11B 17/04*   (2006.01)
*G11B 17/03*   (2006.01)
(52) U.S. Cl. ................. 720/602; 720/606; 369/30.36
(58) Field of Classification Search ............. 720/601, 720/602, 606; 369/30.27, 30.36
See application file for complete search history.

(56) References Cited

U.S. PATENT DOCUMENTS

| 4,722,078 | A | 1/1988 | Nakanishi et al. |
| 6,922,378 | B2 * | 7/2005 | Shen ..................... 369/30.27 |
| 2002/0054451 | A1 | 5/2002 | Moon et al. |
| 2002/0089776 | A1 | 7/2002 | Hirano et al. |

FOREIGN PATENT DOCUMENTS

| EP | 0698882 A2 | 2/1996 |
| EP | 0698882 B1 | 2/1996 |
| JP | 09091820 A * | 4/1997 |
| JP | 10112106 A * | 4/1998 |
| JP | 2000306245 A | 11/2000 |

OTHER PUBLICATIONS

ISR Publication, International Publication No. WO2005/001827(A1).

* cited by examiner

*Primary Examiner*—William J. Klimowicz
(74) *Attorney, Agent, or Firm*—Michael E. Belk

(57) ABSTRACT

A disk drive comprising a tray (TR) for receiving a disk, the tray (TR) being supported for movement between a first position within a casing (CS) of the disk drive and a second position projecting from the casing (CS), an electric motor for moving the tray (TR) between the first and second positions, and a regulation device for regulating an electric current through the motor for regulating the rotation of the motor. The regulation device comprises a detection device for detecting a back-electromotive voltage produced during rotation of the motor for deriving position information of the tray (TR) with respect to the first and second positions.

4 Claims, 3 Drawing Sheets

DISK DRIVE WITH IMPROVED TRAY CONTROL

BACKGROUND OF THE INVENTION

1. Field of the Invention

The invention relates in general to a disk drive, and more specifically to an optical disk drive comprising a tray for receiving a disk, the tray being supported for movement between a first position within a casing of the disk drive and a second position projecting from the casing, an electric motor for moving the tray between the first and second positions, and regulation means for regulating an electric current through the motor for regulating the rotation of the motor.

The invention also relates to a method of moving a tray of a disk drive between a first and a second position under the control of an electric motor.

2. Description of the Prior Art

As is commonly known, an optical storage disk comprises at least one track, either in the form of a continuous spiral or in the form of multiple concentric circles, of storage space where information may be stored in the form of a data pattern. An optical disk drive comprises inter alia a tray for loading the disk drive, rotating means for receiving and rotating the optical disk, and light generation means for generating an optical beam, typically a laser beam, for scanning the storage track with said laser beam. Since the technology of optical disks in general and the way in which information can be stored in an optical disk are commonly known, it is not necessary to describe this technology in great detail.

In optical data storage devices, the medium (e.g. the CD, DVD, or BD disk) is loaded into the disk drive by a loader mechanism, which generally comprises the tray, a tilting mechanism, and a (magnetic) clamp. To play or read a disk, the user places the disk on the tray which, after the user has pressed a button or the tray itself, transports the disk into the disk drive. When the tray is inside the disk drive, the tilting mechanism tilts the turntable upwards such that the disk is lifted off the tray. The clamp, finally, fixes the disk onto the turntable. To eject the disk from the disk drive, the loader mechanism is driven in the reverse direction.

The loader mechanism (tray and tilting mechanism) is usually driven by a DC motor via a gear transmission. The electrical current $I_m$ through the motor obeys the following equation:

$$V_m - V_{emf} = RI_m + L\frac{dI_m}{dt}. \quad (1)$$

$V_m$ is the voltage driving the motor, Vemf is the back-EMF voltage, R is the motor resistance, and L is the motor inductance. Usually a hardware switch (usually mechanical or optical) is included in the disk drive in order to detect whether the tray or the loader mechanism has completed an opening/closing action. Such a hardware switch is generally called a tray switch. It is known that the end stops of the tray motion can be detected by measurement of the tray motor current, as follows. When the tray hits one of the end stops, the motor blocks and consequently the back-EMF voltage generated by the motor drops. This causes a sudden and remaining increase in the motor current. This increase in motor current at the end stop can be detected by means of a level detection algorithm: if the current exceeds a certain limit for a certain amount of time, it is decided that the tray has reached a stop, and the motor is turned off. The motor current may be measured, for example, in that a measuring resistor is connected in series with the motor, and the voltage across the resistor is measured. Detection of the end stops from the motor current measurement obviates the need of a hardware (mechanical or optical) switch to detect the end stops. Detection of end stops by current measurement without a tray switch will be called "switchless detection" in the following.

A shortcoming of the method of switchless detection compared with the traditional tray switch method is the uncertainty of the tray position. A tray switch gives complete certainty about whether the tray is actually closed: if the switch is closed, the tray must be at either one of its end positions. Switchless detection does not give full certainty about the actual position of the tray after a stop: it could be that the user of the disk drive has manually forced a tray stop at an intermediate position.

Another shortcoming of the method of switchless detection compared with the traditional tray switch method is the twisting motion of the tray as it hits the outside stop.

With switchless detection, a stop is detected after the tray has been mechanically blocked by the end stop. For a short duration, the tray is simultaneously being driven by the motor, and blocked by the end stop. The force that the motor exerts on the tray generally does not attach to the center of gravity of the tray. Furthermore, there is generally some mechanical play in the tray mechanism, particulary when the tray is at the outside position. Consequently, in this short phase in which the tray is driven and blocked at the same time, it can occur that the tray displaces sideways or twists. This kind of motion is undesired, especially in audio/video disk drives.

SUMMARY OF THE INVENTION

It is therefore an object of the invention to provide an improved method of detecting an end stop of a tray action.

To achieve the object of the invention, the disk drive as defined in the opening paragraph is characterized in that the regulation means comprises detection means for detecting a back-electromotive signal (e.g. a voltage) produced during rotation of the motor for deriving position information of the tray with respect to the first and second positions.

In this way the position of the tray can be inferred from the electrical current through the motor without any additional hardware components.

An embodiment of the disk drive is characterized in that the regulation means regulates the electric current through the motor such that, during movement of the tray in a direction from one of the first and second positions to the other one of the first and second positions, the rotation rate of the motor is gradually reduced when the position of the tray has reached the vicinity of the respective one of the first and second positions.

By doing so, the undesired sideways or twisted motion of the tray mentioned above is eliminated or diminished.

The invention also includes the methods as defined in claims 3 and 4.

BRIEF DESCRIPTION OF THE DRAWINGS

The invention will be described in more detail with reference to the accompanying drawings, in which:

In these Figures, parts or elements having like functions or purposes bear the same reference symbols.

FIG. 1 is a schematic drawing of a disk drive DRV. The disk drive DRV is implemented in an outer casing CS. A tray TR for receiving and transporting a disk is capable of sliding into and from the casing CS in a direction indicated by "x". The indicated lengthwise direction of the tray TR does not exactly match with the direction x. This is a situation which often occurs in the known optical disk drives. It is caused by the fact that when the tray TR moves from a first position in which it is within the casing CS to a second position projecting from the casing CS, the movement of the tray TR has suddenly been stopped by the blocking means (or end stop) BLK. As a consequence, forces DRF cause a rotation RT since generally the forces DRF do not attach to the center of gravity of the tray TR. Furthermore, there is generally some mechanical play in the tray mechanism. The tray TR is controlled by a motor (not indicated in FIG. 1). In the invention the stopping of the tray TR is initiated by information received from the back-EMF electromotive signal (voltage or current) of the motor. Also, preferably, with the aid of this information a slowdown or braking action can already be initiated a short distance before the desired stopping position is reached.

The electromotive back-EMF voltage Vemf is proportional to the (angular) speed of the motor. It is expressed by the following equation:

$$V_{emf} = K_e \frac{d\phi}{dt}. \quad (2)$$

$K_e$ is the so called back EMF constant of the motor. Combining equation [2] and equation [1] results, after integration, in the following expression for the angular position of the motor at time t.

$$\phi(t) = \phi(0) + \frac{1}{K_e}\left(\int_0^t (V_m(t) - RI_m(t))\,dt - L(I_m(t) - I_m(0))\right) \quad (3)$$

Given that R and L are known, and assuming that $\phi(0)=0$, the above expression allows to infer the angular position of the motor, because $V_m$ is known and $I_m$ is measured by detection means. The detection means, which is part of the regulation means which regulates the motor (also in the known disk drives), may be implemented, for example, by a resistor in series with the motor. The voltage across this resistor is then a measure for $I_m$. With respect to the position of the tray, denoted x, it holds that:

$$x=\alpha\phi, \quad (4)$$

with α being some known constant. The position measurement can be simplified further by assuming that the motor inductance L is negligibly small, which is allowed in most cases. Then one only needs to know the value of the motor resistance R in order to infer the position of the tray.

Figure 1:
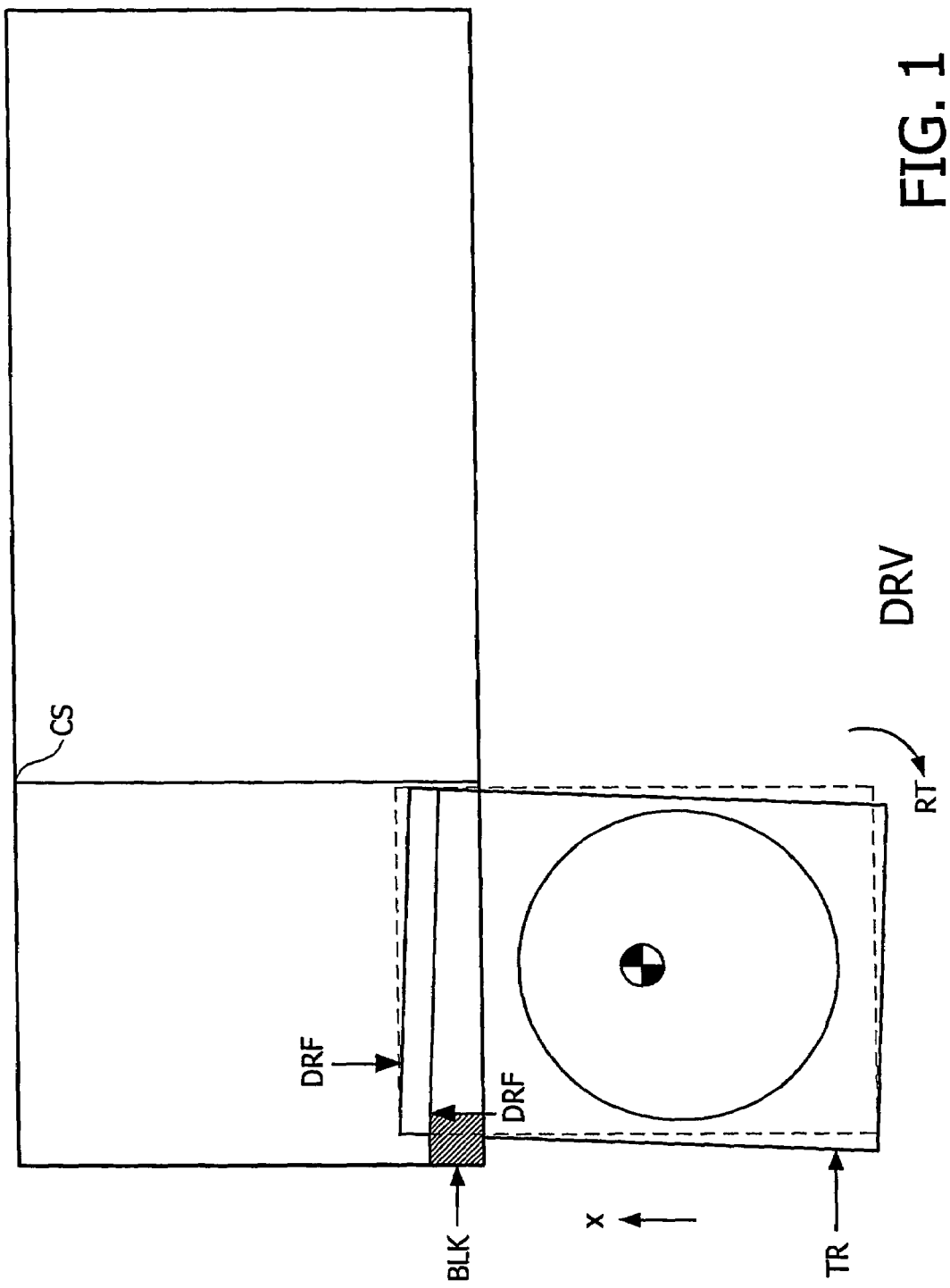
FIG. 1 is a schematic drawing of a disk drive illustrating the tray function.
Figure 2:
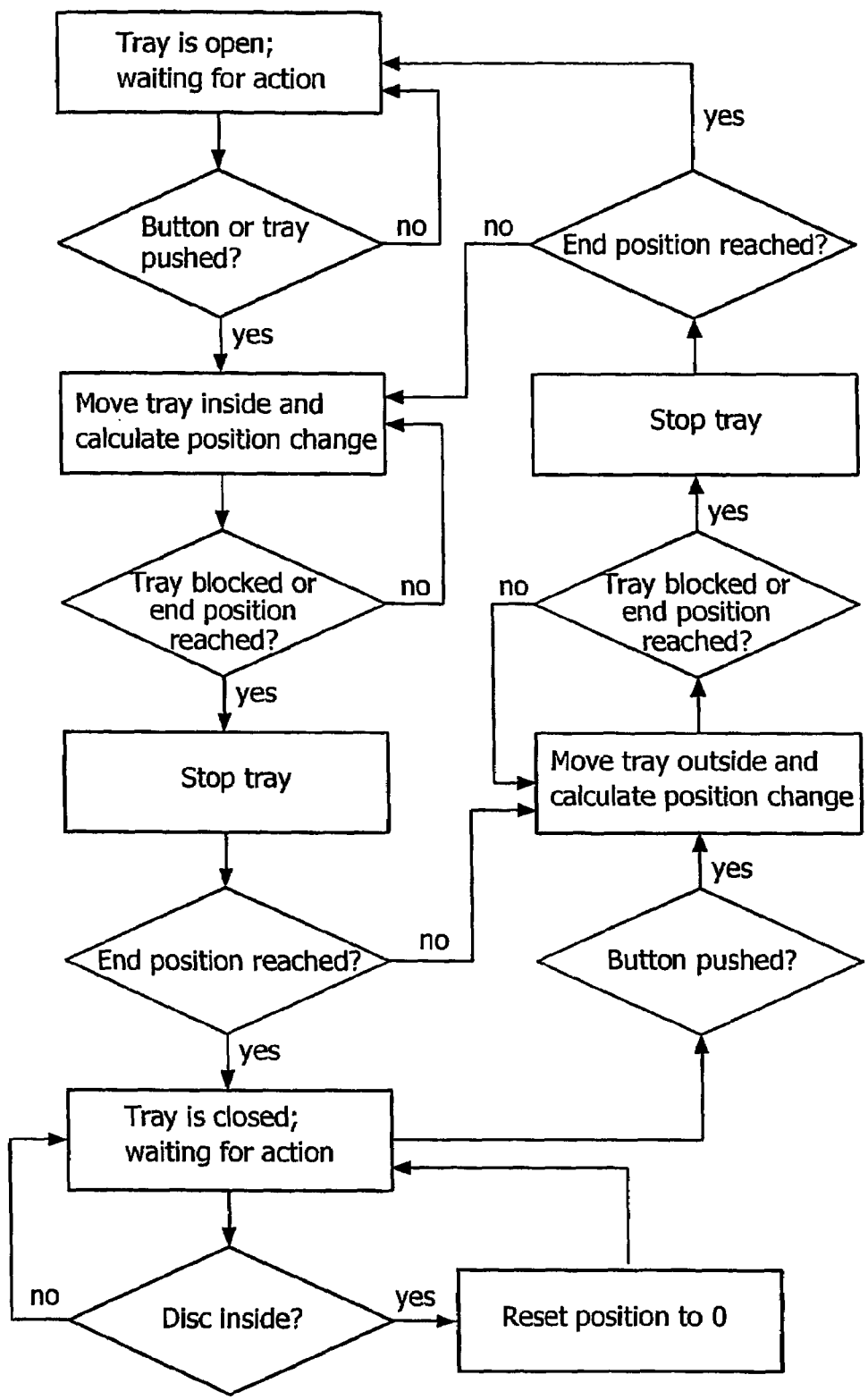
FIG. 2 is a first flow chart showing an inventive method for tray control of the disk drive.

FIG. 2 is a first flow chart showing an inventive method for tray control of the disk drive DRV. It illustrates how position measurement can be used to enhance switchless detection. If, for example, during a closing motion the tray TR is blocked (e.g. manually) at some intermediate position, the optical disk drive, using the inventive method, will subsequently responds by opening the tray TR and returning to its original (open) position. Position or displacement information of the tray TR can be used to enhance switchless detection, as follows. Position information can be used by the tray open and close algorithm to conclude whether the tray TR has completed a full open or close motion. Proper action can be taken if the tray TR has only opened halfway, e.g. because a user has manually blocked the tray TR The tray TR can be stopped just before it reaches the outside stop. This prevents twisting of the tray at the outside end stop. In this way, the shortcomings of switchless detection compared with detection with a tray switch are overcome.

Figure 3:
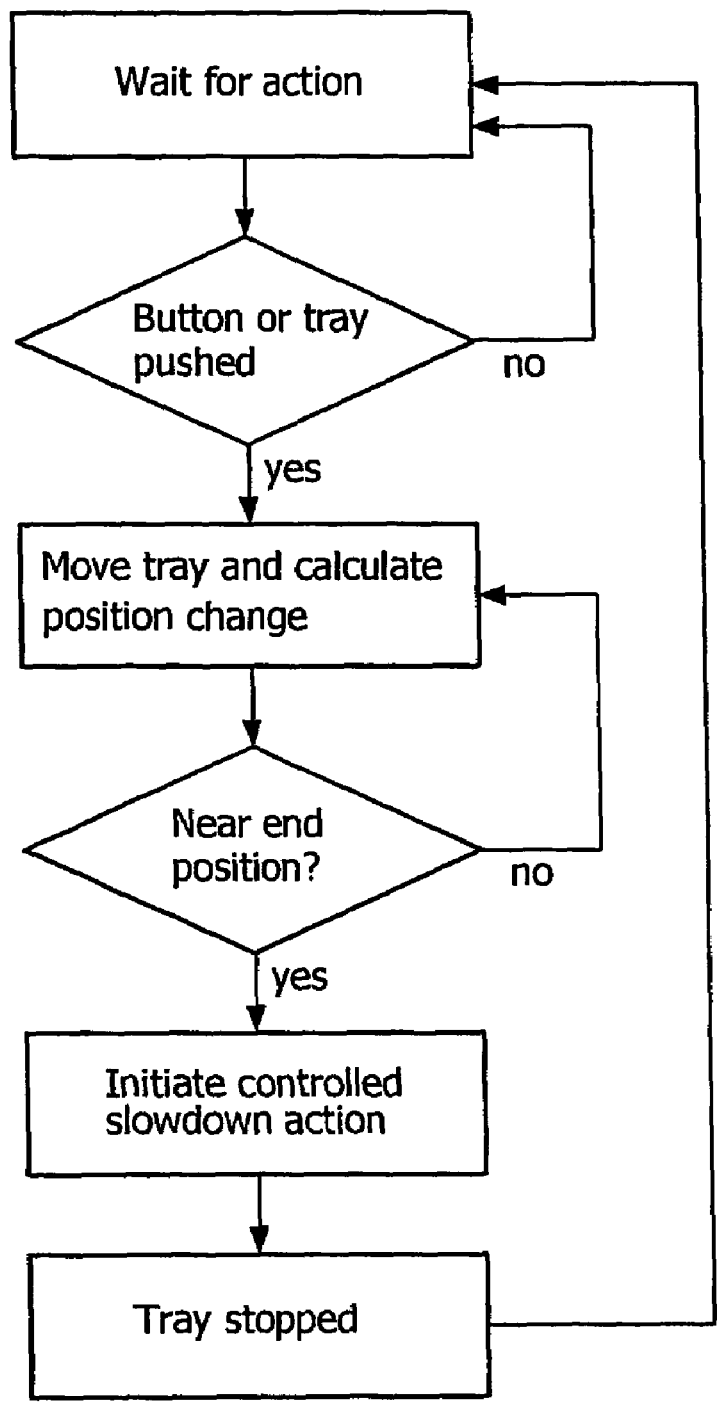
FIG. 3 is a second flow chart showing the inventive method for tray control of the disk drive in respect of a further improved stop control of the tray.

FIG. 3 is a second flow chart showing the inventive method for tray control of the disk drive in respect of further improved stop control of the tray TR. The availability of the knowledge of the tray position during a tray movement renders it possible to stop the tray TR in a very controlled and smooth manner. A slowdown or braking action can already be initiated a short distance before the desired stopping position is reached. Even if a tray switch is present, measuring the position of the tray TR as described above can be beneficial. Using the tray switch, the exact position of the tray TR is only known if the tray TR is at either one of the end stops. With position measurement, the tray position is also known when it is at intermediate positions. This information can be used to enhance the open/close algorithm, e.g. in the form of initiating a slowdown or braking action just before reaching the end stop.

Position measurement according to equation [3] requires computation of the integral $\int_0^t (V_m - RI_m)$. In the actual digital implementation this integration can be approximated by a summation. In this case the position at a sampling instant n is approximately given by $$\phi[n] = \phi[0] + \frac{T}{K_e}\sum_{k=0}^{n}(V_m[k] - RI_m[k]). \quad (5)$$

Here, T represents the sampling time of the digital implementation. Note that equation [5] is the simplest possible approximation of the integral in equation [3]. Better approximations, such as trapezoidal approximation, Simpson's rule, and more elaborate methods, may also be used. Such methods can be found in various recognized handbooks. The computation of the tray position with equation [3] may be disturbed by measurement inaccuracies, noise, and drifts. Therefore, preferably, the measured position is calibrated once in a while. For this purpose it is advised to reset the measured position to zero (see FIG. 2) whenever the tray TR is known to be inside the casing CS. If a disk is in the disk drive DRV and can be played or read by the disk drive DRV, then one is absolutely sure that the tray TR is the innermost position, and the tray position can be reset to zero at this point.

The invention claimed is:

1. A disk drive comprising a tray (TR) for receiving a disk, the tray (TR) being supported for movement between a first end stop position within a casing (CS) of the disk drive and a second end stop position projecting from the casing (CS), an electric motor for moving the tray (TR) between the first and second end stop positions, and regulation means for regulating an electric current through the motor for regulating the rotation of the motor, characterized in that the regulation means comprises detection means for detecting a back-electromotive signal produced during rotation of the motor for deriving position information of the tray (TR) with respect to the first and second end stop positions, and means for stopping said tray at one of said first and second end stop positions as a function of said position information.

2. A disk drive according to claim 1, characterized in that the regulation means regulates the electric current through the motor such that, during movement of the tray (TR) in a direction from one of the first and second end stop positions to the other one of the first and second end stop positions, the rotation rate of the motor is gradually reduced when the position of the tray (TR) has reached the vicinity of the respective one of the first and second end stop positions.

3. A method of moving a tray of a disk drive between a first end stop position and a second end stop position under the control of an electric motor, characterized in that detection means detects a back-electromotive signal produced during rotation of the motor for deriving position information of the tray with respect to the first and second end stop positions, and stopping said tray at one of said end stop positions as a function of said position information.

4. method according to claim 3, characterized in that, when the tray moves in a direction from one of the first and second end stop positions to the other one of the first and second end stop positions, and when the position of the tray comes close to one of the first and second end stop positions, the rotation rate of the motor is gradually reduced.

* * * * *